US007051777B2

(12) United States Patent
Tarasinski et al.

(10) Patent No.: US 7,051,777 B2
(45) Date of Patent: May 30, 2006

(54) PRESSURE TRANSMITTING AXLE ASSEMBLY

(75) Inventors: Nicolai Tarasinski, Frankenthal (DE); Bernd Kneer, Viernheim (DE); Hans-Christian Jungmann, Weinheim (DE)

(73) Assignee: Deere & Company, Moline, IL (US)

( * ) Notice: Subject to any disclaimer, the term of this patent is extended or adjusted under 35 U.S.C. 154(b) by 62 days.

(21) Appl. No.: 10/859,816

(22) Filed: Jun. 3, 2004

(65) Prior Publication Data

US 2005/0000758 A1    Jan. 6, 2005

(30) Foreign Application Priority Data

Jun. 20, 2003  (DE)  ................................ 103 27 650

(51) Int. Cl.
*B60C 23/00*   (2006.01)
(52) U.S. Cl. .................. 152/417; 152/415; 137/224
(58) Field of Classification Search ................ 152/415, 152/416, 417, 418, 419; 137/224, 226; 73/146.2
See application file for complete search history.

(56) References Cited

U.S. PATENT DOCUMENTS 2,218,143 A * 10/1940 Birchfield .................. 73/146.4
4,223,769 A * 9/1980 Servanton et al. ......... 192/221.1
5,221,381 A * 6/1993 Hurrell, II ................... 152/416
6,182,727 B1 * 2/2001 Beesley ....................... 152/417
6,439,044 B1   8/2002 Tigges ......................... 73/146.2
6,943,674 B1 * 9/2005 Tsai ............................. 340/442
2004/0045651 A1 * 3/2004 Haunhorst et al. .......... 152/415

FOREIGN PATENT DOCUMENTS

| DE | 39 21 104 A1 | 2/1991 |
| DE | 40 29 311 C2 | 3/1992 |
| DE | 199 50 191 C 1 | 5/2001 |

* cited by examiner

*Primary Examiner*—Frantz F. Jules

(57) ABSTRACT

An axle assembly has a fixed axle housing, a rotating axle body rotatably mounted in said axle housing, and a first chamber which surrounds the axle body. The first chamber is partially bounded by a ring member which rotates with the axle body. An annular disc is mounted on the axle body adjacent to the ring member. The disc extends radially outwardly beyond an outer rim of the ring member and radially overlaps the ring member. The disc is axially slidable towards and away from the ring member. When the disc is spaced apart from the ring member an opening or space is formed therebetween through which may be communicated pressurized air to inflate a tire. The disc is moved axially by a ring mounted on an annular piston member which is mounted on and axially movable with respect to the axle housing.

18 Claims, 2 Drawing Sheets

PRESSURE TRANSMITTING AXLE ASSEMBLY

BACKGROUND

The present invention relates to an axle assembly having a fixed axle housing and a rotating axle body rotatably mounted in the housing.

Agricultural vehicles are often provided with systems for regulating tire pressure, so that tire pressure can be controlled during operation of the vehicle to reduce tire pressure to reduce ground impact, and to increase tire pressure for street travel. This also enables adjustment of the tire pressure to various load situations. Agricultural vehicle tires can be inflated by feeding pressurized air to the wheels via a system of passages in the axle assembly.

U.S. Pat. No. 6,439,044 discloses a tire pressure regulation apparatus having a rotary pressure transmitting assembly for transmitting pressure to a rotating wheel from a non-rotating fixed part of the vehicle. This assembly includes a rotating annular member and a non-rotating annular member, both concentric to the axis of rotation. The annular members are coupled together by guide bands. The annular members are spaced apart axially from each other on opposite sides of a movement gap. Concentric annular grooves are formed in a surface of the non-rotating annular member which faces the rotating annular member. A pair of ring seals are mounted in each groove. The ends of the grooves opposite from the rotating annular member are connected to a pressurized control line. When a control pressure is applied to the grooves, the seals are moved toward the rotating annular member, thus sealing around a passage which opens into a chamber.

A drawback of this pressure regulation apparatus is that there is high wear between the annular members and the guide bands due to the constant relative movement between the annular members and the guide bands. Additionally, this apparatus provides only a small pressure flow passage, resulting in flow rates and long tire filling times. Longer filling times produce more frictional wear, resulting in more frequent maintenance. Moreover, the annular grooves are costly to manufacture.

SUMMARY

Accordingly, an object of this invention is to provide such an axle assembly which avoids the above-described drawbacks.

A further object of the invention is to provide such an axle assembly which experiences a low degree of wear.

A further object of the invention is to provide such an axle assembly which allows a high volumetric flow rate of pressurized air for tire inflation, and thereby enables short filling times.

According to the invention, an axle assembly includes a rotating axle body rotatably received by a non-rotating axle housing. A first chamber surrounds a portion of the axle body. A second chamber surrounds a portion of the axle housing and the axle body. A ring member is mounted for rotation with and fixed axially on the axle body and partially encloses the first chamber. An annular disc is mounted for rotation with the axle body and also partially encloses the first chamber. The disc extends radially outwardly beyond an outer peripheral surface of the ring member and concentrically overlaps the ring member.

An annular piston member is mounted on the axle housing and is movable axially with respect to the axle housing. A ring is rotatably mounted on the piston member. The piston member is movable from a non-activated state wherein the ring is spaced apart from the disc to a position wherein the ring is moved axially into engagement with disc. Upon further movement of the piston member, the disc is moved axially with respect to the axle body from a first position wherein the disc engages the ring member and encloses the first chamber, to a second position spaced axially away from the ring member to form an annular space between overlapping portions of the disc and the ring member. The space forms a passage through which pressurized fluid may be communicated between the first and second chambers. Thus, communication between the first and second chambers is controlled by axial movement of the disc. A resilient member engages the disc and is biased to urge the disc towards the ring member in opposition to the piston member.

When communication is closed between the first and second chambers, no contact occurs between the rotating disc and ring member and the non-rotating ring mounted on the piston, thus providing a low wear assembly. Further, a relatively large opening is formed between ring member and the disc, thus allowing high volumetric flow rates of the pressurized air, and enabling short filling times.

DETAILED DESCRIPTION

Figure 1:
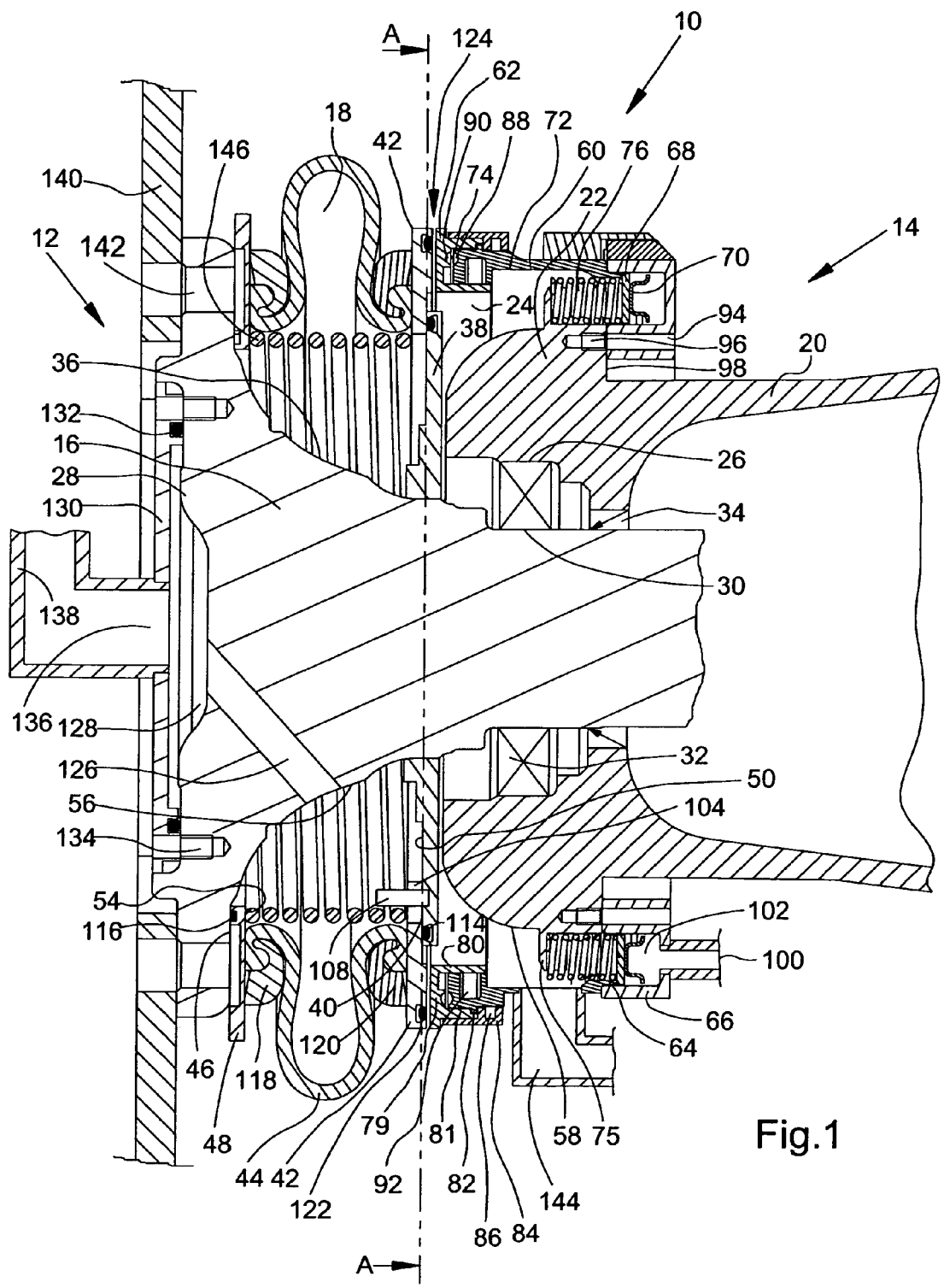
FIG. 1 is a cross sectional view of an axle assembly according to the present invention.

FIG. 1 shows an axle assembly 10 which has a rotating part 12 and a fixed, non-rotating part 14. The rotating part 12 has an axle body 16, a portion of which is surrounded by a first chamber 18. The fixed part 14 includes an axle housing 20 which has an end portion 22 which is surrounded by a second chamber 24. Axle housing 20 forms a bearing chamber 32 which receives a bearing assembly 26 which rotatably supports axle body 16.

The axle body 16 has a funnel-shaped cross section oriented longitudinally with respect to the axis of rotation. The axle body 16 forms a flange 28 at its larger diameter end. The axle body 16 is rotationally symmetric transversely to the axis of rotation. Portion 30 of the axle body 16 is rotatably supported in housing 20 by conventional bearings 26. The bearings 26 are sealed by an axle shaft sealing ring 34.

A first chamber 18 surrounds axle body 16 between bearings 26 and the axle body end 28. First chamber 18 is bounded by an outer surface 36 of the axle body 16, an annular ring member 38 which is sealingly fixed to the axle body 16, an annular disc 42 which overlaps the ring 38 in a radial direction and which is adjacent to a side of ring member 38 which faces first chamber 18, a bellows-shaped structure 44, and an annular disc 48 which adjoins the bellows 44 and which is mounted on a surface 46 of the flange 28 of the axle body. Surface 46 faces toward the axle housing 20.

The ring member 38 is fixed to the axle body 16 for rotation therewith by, e.g., press-forming or screw means. Accordingly, the first chamber 18 is bounded by a side wall 50 of ring member 38, by the disc 42, by an inner surface of bellows 44, a side wall 54 of disc 48, and the outer surface 36 of axle body 16.

A second chamber 24 which surrounds the end 22 of axle housing 20 is bounded by an outer surface 58 of the end 22, ring member 38, an inner surface of an annular slide element or piston 60, and an inner surface of ring 62.

The piston 60 has an end 64 which is guided in an annular cylinder 66. The end 64 adjoins an annular cover 68 which effectively forms an annular cylindrical surface 70 which functions as a piston surface inside the annular cylinder 66. Piston 60 includes a body 72 which extends from end 64 towards ring 62 to a bearing end 74.

The annular cover 68 is fixed to the guide portion 64 of piston 60. A compression spring 76 is mounted between cover 68 and a projection 75 formed on the outer side of the axle housing end 22. Spring 76 is configured as a restoration spring which is biased to urge piston 60 away from disc 42 and into a retracted base position.

Ring 62 is rotatable with respect to housing 20 and has a U-shaped profile formed by inner wall 80, end wall 79 and outer wall 81. Ring 62 will rotate when it engages rotating disc 42, and it will cease rotating when it is retracted away from disc 42. Piston 60 includes an annular radially outward projection 82 which can engage and limit axial movement of piston 60. Projection 82 cooperates with a sleeve or collar 84 which is mounted around ring 62 and around an outer surface of piston 60. One end of sleeve 84 is threadably coupled to ring 62 and the other end of sleeve 84 abuts against annular projection 82, so that the ring 62 is rotatably coupled to and has its axial motion limited by the piston 60. A felt ring 86 protects sleeve 84 from contaminants. A gap 124 is formed when ring 62 is separated from disc 42 and chamber 18 is closed off from chamber 24, and this gap 124 communicates chamber 24 to the environment.

In order to accommodate both axial forces and the simultaneous rotation of the ring 62, annular bearing grooves 88, 90 are formed in an end 74 of the piston 60 and on an inner side of ring 62 for receiving a number of ball bearings (not shown).

A sealing ring 92 is mounted between inner wall 80 of ring 62 and piston 60. The sealing ring 92 may comprise a seal such as a "Rotomatic" sealing ring assembly, consisting of an O-ring and a PTFE (polytetrafluoroethylene) ring. Such a sealing ring assembly 92 is made by Freudenberg.

As previously mentioned, the piston 60 has an end 64 which is guided in an annular cylinder 66. The annular cylinder 66 is connected to a projection 98 by bolts (not shown) which extend through bores 94 and are screwed into threaded bores 96. In this way the cylinder 66 is fixed to the axle housing end 22. The annular cylinder 66 forms a pressure chamber 102 which receives hydraulic fluid via hydraulic connection 100 for actuating the piston 60. Preferably, a hydraulic system (not shown) already present on the vehicle (not shown) can be used for this purpose.

Figure 2:
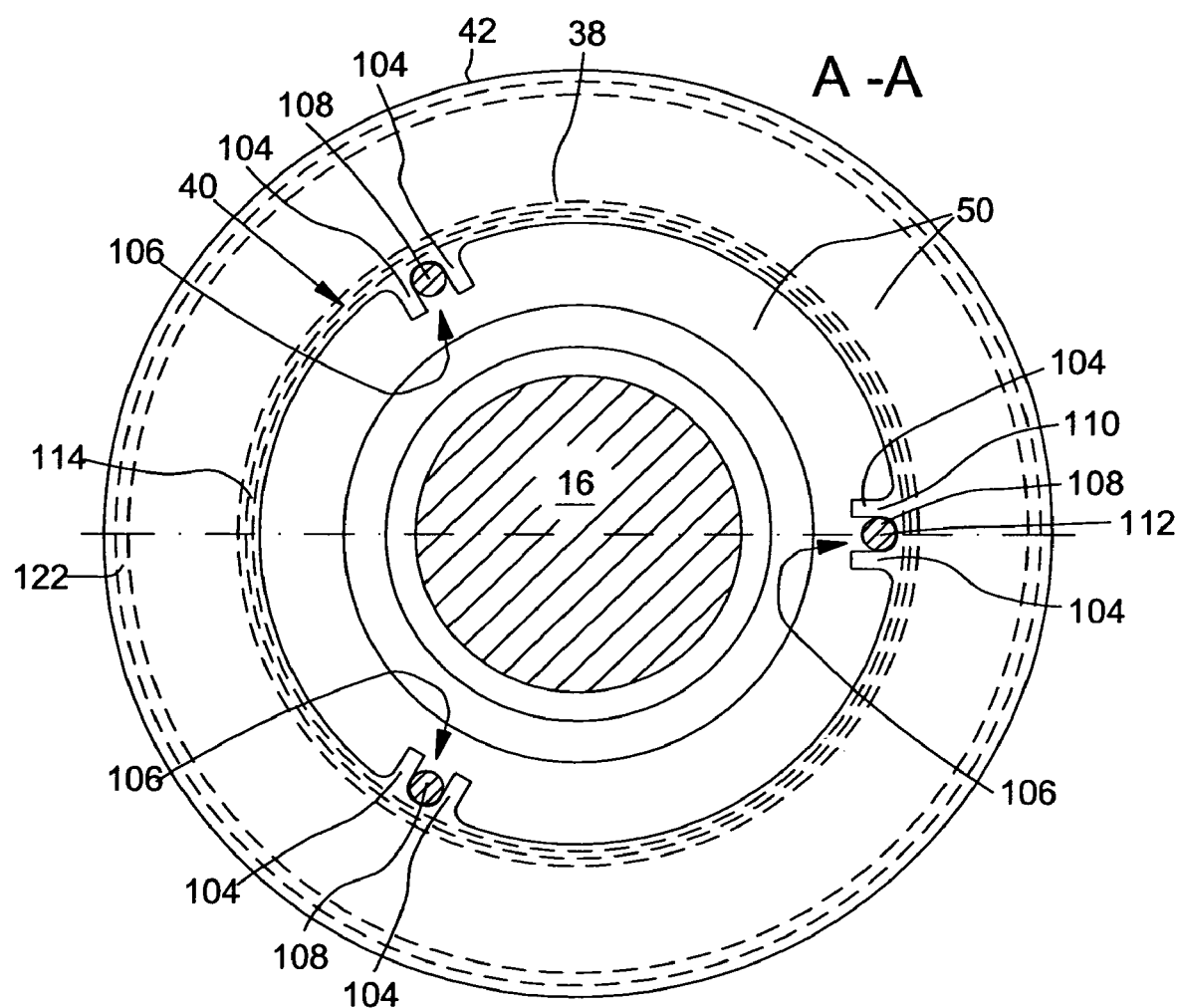
FIG. 2 is a cross sectional view along lines A—A of FIG. 1.

Referring now to FIG. 2, the disc 42 has radially inwardly directed pairs of guide cogs 104 on its inner edge, which form radially inwardly opening guide grooves 106. For example, disc 42 may have 6 guide cogs 104 and three guide grooves 106. Guide pins 108 project axially from ring member 38 for guiding disc 42, only one of which is seen in FIG. 1. One end of each such guide pin 108 is fixed to the ring member 38, such as by screw threads or press fitting. The guide pins 108 are spaced apart around the circumference of the ring member 38, at the same distances apart as the guide grooves 106. Further, the middle points 110 of the guide cogs 104 and the center points 112 of the guide pins 108 are at essentially the same radial distance from the axis of rotation. The disc 42 is coupled to the ring member 38 by the guide pins 108 and the guide grooves 106, so that the ring member 38 cannot rotate with respect to the disc 42, but can be slid axially with respect to disc 42.

In order to assure an airtight seal of the first chamber 18, a sealing ring 114 is mounted in a groove in ring member 38 and is sealingly engagable with an inner portion of disc 42. A similar sealing ring 116 is mounted in a groove in disc 48 for sealing engagement with flange 28 on the opposite side of the first chamber 18.

In addition, airtight seals are formed between end portions 118, 120 of bellows 44 and discs 48 and 42, respectively. A sealing ring 122 is mounted in a groove near an outer edge of disc 42 and is capable of sealing engagement with end 79 of ring 62 when the piston 60 presses ring 62 against disc 42.

When piston 60 is activated by pressure in chamber 102 piston 60 moves towards disc 42 and piston 60 moves ring 62 into engagement with disc 42. In a non-activated state spring 76 moves piston 60 and ring 62 away from disc 42, thus creating the gap 124 between ring 62 and disc 42.

The bellows 44 urges disc 42 against the ring member 38 and urges disc 48 against the surface 46 of the axle flange 28, so that sealing rings 114, 116 form airtight seals. Also, bellows end portions 118, 120 form airtight seals against the annular discs 48 and 42, respectively, so that the first chamber 18 can receive pressurized air. The filling of chamber 18 also increases the pressure on the bellows 44, on the annular disc 42, and on the disc 48, so that the air pressure intensify the sealing. To increase the sealing forces, an additional compression spring 146 may be installed between the discs 42 and 48, which spring 146 acts to press the discs more strongly against ring member 38 and the surface 46, respectively. A similar effect can be achieved if the bellows 44 is reinforced by a sheet spring, or sheet spring strips (not shown).

The axle body 16 is provided with a plurality of connecting channels 126 which communicate first chamber 18 with a depression 128 on the end face of the axle body end region 28 (only one channel 126 is visible in FIG. 1). The depression 128 is covered by a cover 130 which has a sealing ring 132 to provide an airtight seal with respect to the environment. The cover 130 is attached to flange 28 by a plurality of bolts (not shown) which are distributed around its circumference and which are received by threaded bores 134 in the end face of the flange 28. The cover 130 and sealing ring 132 seals the depression 128 airtight with respect to the environment.

A connecting tube 138 is attached to cover 130 for communicating depression 128 to a tire chamber (not shown) of a wheel 140 mounted on the axle flange 28. The wheel 140 is mounted via bores 142 formed in the axle flange 28. To fill or inflate the tire chamber, pressurized air is fed into the second chamber 24 through an inlet 144 formed on the piston 60. In particular, chamber 102 is pressurized and piston 60 moves axially toward disc 42, until the ring 62 engages disc 42, and disc 42 is slid axially into the interior of the first chamber 18. As soon as ring 62 (which is rotatably mounted on the piston 60) engages the disc 42, ring 62 begins to co-rotate with disc 42. Disc 42 moves axially away from ring member 38, forming an open area or space between the ring member 38 and disc 42. This open area communicates the first chamber 18 with second chamber 24. At the same time, the sealing ring 122 provides an airtight seal between the ring 62 and disc 42.

The pressurized air flows from inlet 144 into second chamber 24, and through the open area between disc 42 and ring member 38 and into the first chamber 18. The pressurized air is communicated from chamber 18 through channels 126 into depression 128. Tube 138 then communicates pressurized air into the tire chamber (not shown) in the wheel 140.

By controlling the pressure, it is also possible, using the same manner of actuation, to reduce the pressure in the tire chamber. By creating an open area between disc 42 and ring member 38, the air can flow out of the tire chamber, as long as the pressure supplied from inlet 144 is lower than the pressure prevailing in the tire chamber and the first chamber 18.

When the pressure in chamber 102 is reduced, disc 42 moves into sealing engagement with ring member 38, thus closing pressurized chamber 18, and piston 60 is retracted by spring 76, and ring 62 moves axially away from disc 42, thus forming the gap 124 between the ring 62 and the disc 42. The pressure in chamber 18 holds disc 42 against the ring member 38, so that sealing ring 114 creates an airtight seal between disc 42 and ring member 38, thus isolating and sealing the tire chamber and first chamber 18.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. An axle assembly comprising:
a rotating axle body rotatably received by a non-rotating axle housing;
a first chamber surrounding a portion of the axle body;
a ring member mounted for rotation with the axle body and partially enclosing the first chamber; and
a first annular disc mounted for rotation with the axle body, the first disc extending radially outwardly beyond an outer peripheral surface of the ring member and concentrically overlapping the ring member, the first disc being axially movable with respect to the axle body between a first position wherein the first disc engages the ring member and encloses the first chamber, and a second position spaced axially away from the ring member to form an annular space between overlapping portions of the first disc and the ring member, said space forming a passage through which pressurized fluid may be communicated with the first chamber.

2. The axle assembly of claim 1, further comprising:
an annular piston member mounted on the axle housing and movable axially with respect to the axle housing; and
a ring rotatably mounted on the piston member, the piston member being movable to move the ring axially into engagement with the first disc and to axially move the ring and the first disc, the piston member having a non-activated state wherein the ring is spaced apart from the first disc.

3. The axle assembly of claim 2, further comprising:
a resilient member which engages the first disc and is biased to urge the first disc towards the ring member in opposition to the piston member.

4. The axle assembly of claim 2, wherein:
a second chamber is enclosed by an outer surface of the axle housing, together with inner walls of the piston member, the ring, the ring member and the first disc; and
communication between the first chamber and the second chamber is controlled by axial sliding of the first disc.

5. The axle assembly of claim 4, wherein:
the piston member includes an air inlet for feeding pressurized air to the second chamber.

6. The axle assembly of claim 2, further comprising:
a restoring spring connected to the piston member.

7. The axle assembly of claim 2, further comprising:
a first sealing ring disposed between the ring member and the first disc; and
a second sealing ring disposed between the first disc and the ring.

8. The axle assembly of claim 7, further comprising:
a third sealing ring disposed between the ring and the piston member, the third sealing ring sealing a space between the ring and the piston member.

9. The axle assembly of claim 2, wherein:
a sleeve element couples the ring to the piston member so that the ring moves axially with the piston member.

10. The axle assembly of claim 2, wherein:
air pressure in the first chamber acts upon the first disc and urges the first disc towards the ring member in opposition to the piston member.

11. The axle assembly of claim 2, wherein:
the piston member is hydraulically controllable.

12. The axle assembly of claim 1, further comprising:
a further annular disc which is pressed against the axle body; and
a bellows member which encloses the first chamber in a radial direction, the bellows member being disposed between the first disc and the further annular disc.

13. The axle assembly of claim 12, wherein:
the ring member, the first disc, the bellows member, the further disc and the axle body enclose the first chamber.

14. The axle assembly of claim 12, wherein:
the resilient member comprises a compression spring which is compressible between the first disc and the further disc.

15. The axle assembly of claim 1, wherein:
a connecting channel extends through the axle body and communicates the first chamber to an end of the axle body.

16. The axle assembly of claim 1, wherein:
a connecting channel extends through the axle body and communicates the first chamber to a depression formed in an end of the axle body; and
a cover is sealingly attached to the end of the axle body, the cover covering the depression in an airtight manner.

17. The axle assembly of claim 16, wherein:
wheel mounting bores are formed in the end of the axle body exterior to the axle cover.

18. The axle assembly of claim 17, wherein:
a connector for a connecting line is connected to the cover, the connector opening into the depression.

* * * * *